United States Patent
Gailloux et al.

(10) Patent No.: US 9,301,111 B1
(45) Date of Patent: *Mar. 29, 2016

(54) RECONCILING CONTACT INFORMATION BETWEEN USERS

(71) Applicant: Sprint Communications Company L.P., Overland Park, KS (US)

(72) Inventors: Michael A Gailloux, Overland Park, KS (US); Kenneth W Samson, Belton, MO (US)

(73) Assignee: Sprint Communications Company L.P., Overland Park, KS (US)

(*) Notice: Subject to any disclaimer, the term of this patent is extended or adjusted under 35 U.S.C. 154(b) by 173 days.

This patent is subject to a terminal disclaimer.

(21) Appl. No.: 13/667,470

(22) Filed: Nov. 2, 2012

Related U.S. Application Data

(63) Continuation of application No. 12/732,804, filed on Mar. 26, 2010, now Pat. No. 8,340,651.

(51) Int. Cl.
*H04M 3/00* (2006.01)
*H04W 4/16* (2009.01)

(52) U.S. Cl.
CPC ...................... *H04W 4/16* (2013.01)

(58) Field of Classification Search
CPC ............... H04L 29/08108; H04M 2207/18; H04M 1/72525; H04M 1/72522; H04M 1/2745; H04W 4/02; H04W 8/245
USPC ......... 455/414.1, 418, 404.1, 404.2; 340/994; 707/758, 769
See application file for complete search history.

(56) References Cited

U.S. PATENT DOCUMENTS

| | | | |
|---|---|---|---|
| 7,289,797 B2 | 10/2007 | Kato | |
| 8,340,651 B1* | 12/2012 | Gailloux | H04L 67/1095 455/415 |
| 8,543,081 B2* | 9/2013 | Scott | H04M 1/2745 455/404.1 |
| 9,064,339 B2* | 6/2015 | Ziemann | G06T 11/20 |
| 2004/0176973 A1* | 9/2004 | Lapeze | G06Q 40/00 709/207 |
| 2010/0190467 A1* | 7/2010 | Scott | H04M 1/2745 455/404.2 |
| 2013/0002676 A1* | 1/2013 | Ziemann | G06T 11/20 345/440 |
| 2013/0007029 A1* | 1/2013 | Ziemann | G06Q 10/00 707/758 |

(Continued)

FOREIGN PATENT DOCUMENTS

EP    1024674    8/2000

OTHER PUBLICATIONS

Preinterview First Office Action in U.S. Appl. No. 12/732,804, mailed Nov. 7, 2011.

(Continued)

*Primary Examiner* — William D Cumming

(57) ABSTRACT

Methods, devices, and products utilize wireless-backup technologies to provide contact-reconciliation services with respect to sets of contacts stored on mobile devices. One embodiment of the inventions includes receiving an indication of an update event associated with a first set of contacts on a first mobile device, updating a remotely-stored copy of the first set of contacts, determining that a remotely-stored copy of a second set of contacts does not include a portion of contact information corresponding to the first mobile device, and updating the remotely-stored copy of the second set of contacts. In an embodiment, the remotely-stored copy of the second set of contacts is synchronized with the second set of contacts, thereby updating the second set of contacts.

6 Claims, 7 Drawing Sheets

(56) References Cited

U.S. PATENT DOCUMENTS

| | | | |
|---|---|---|---|
| 2013/0007049 A1* | 1/2013 | Ziemann | G06T 11/20 707/769 |
| 2013/0007126 A1* | 1/2013 | Ziemann | G06Q 50/01 709/204 |
| 2013/0021176 A1* | 1/2013 | Tu | H04W 4/027 340/994 |

OTHER PUBLICATIONS

Final Office Action in U.S. Appl. No. 12/732,804, mailed Mar. 26, 2012.

Notice of Allowance in U.S. Appl. No. 12/732,804, mailed Aug. 10, 2012.

* cited by examiner

RECONCILING CONTACT INFORMATION BETWEEN USERS

This application is a continuation of U.S. patent application Ser. No. 12/732,804, filed Mar. 26, 2010, which is herein incorporated by reference in the entirety.

SUMMARY

Embodiments of the technology are defined by the claims below, not this summary. A high-level overview of various aspects of the technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to reconcile contact information between two or more mobile communications devices. Utilization of aspects of the inventions described herein allows a network to utilize a wireless-backup service to provide address book synchronization. In embodiments, the network offers a reciprocal-add service, whereby when a first user adds a contact associated with a second user to his address book, the second user can be notified that the first user added the second user to the first user's address book. The second user can be provided with an option to have contact information corresponding to the first user added to the second user's address book. The first user can be notified of each of these steps, confirming to the first user that the correct contact information was added to the address book, a benefit that is generally lacking in conventional mobile telephony service offerings. Another example of a new service that can be offered by utilizing aspects of the technology described herein is a forced-removal service, whereby the network can force removal of a contact from an address book such as, for example, in response to recapturing a phone number or assisting a user with a formal complaint regarding harassment by another user or the like.

BRIEF DESCRIPTION OF THE SEVERAL VIEWS OF THE DRAWINGS

Illustrative embodiments of the technology are described in detail below with reference to the attached drawing figures, wherein.

DETAILED DESCRIPTION

Figure 1:
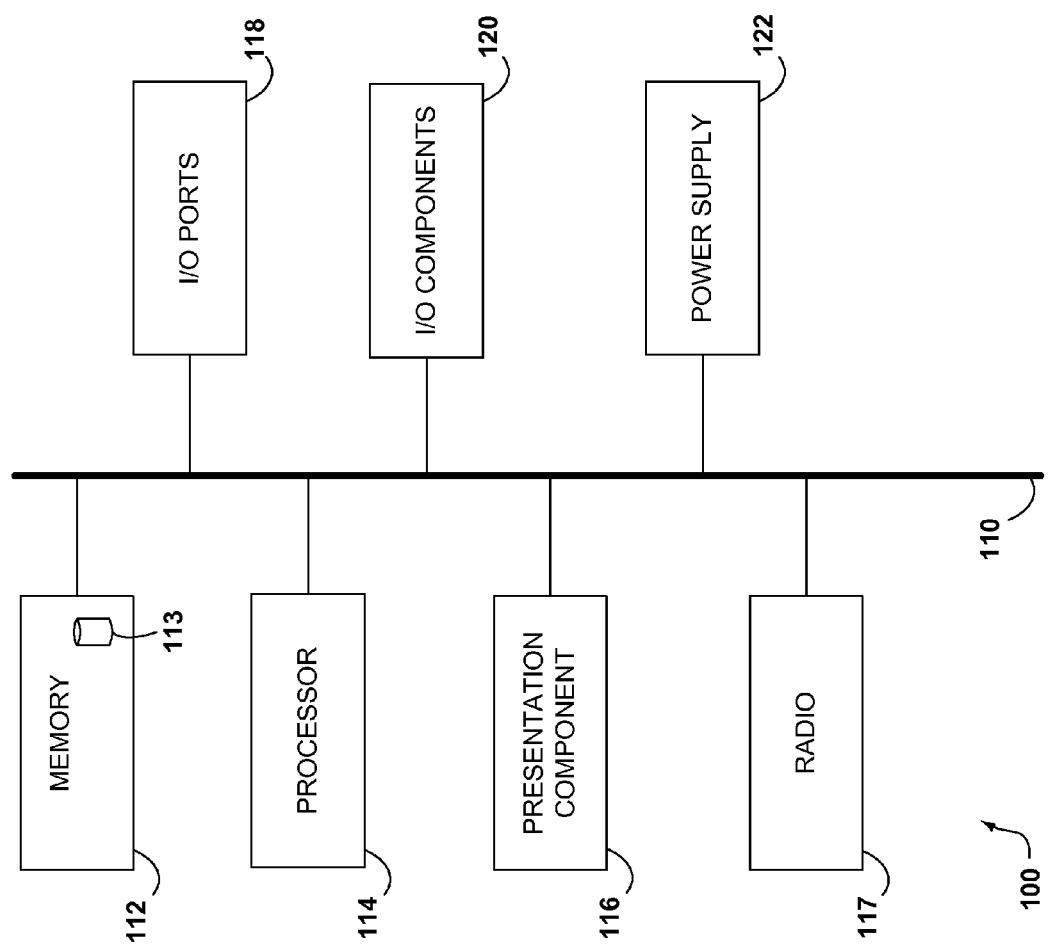
FIG. 1 depicts an illustrative device suitable for use in connection with embodiments of the inventions.

The subject matter of the present technology is described with specificity herein to meet statutory requirements. However, the description itself is not intended to define the technology, which is what the claims do. Rather, the claimed subject matter might be embodied in other ways to include different components, steps, or combinations of components or steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present technology. The following is a list of these acronyms:

API Application Programming Interface
CDMA Code Division Multiple Access
CD-ROM Compact Disc Read-Only Memory
DVD Digital Versatile Disc
EDGE Enhanced Data Rates for GSM Evolution
EEPROM Electrically Erasable Programmable Read-Only Memory
EV-DO Evolution-Data Optimized
GIS Geographic Information System
GPRS General Packet Radio Service
GSM Global System for Mobile Communications
iDEN Integrated Digital Enhanced Network
IMS IP (Internet Protocol) Multimedia Subsystem
LAN Local Area Network
LED Light-Emitting Diode
LTE Long Term Evolution
MCU Multipoint Conference Unit
MMS Multimedia Messaging Service
MN Mobile Network
OMA-DM Open Mobile Alliance—Device Management
PDA Personal Digital Assistant
PTL Push-to-Locate
PTSN Public Switched Telephone Network
PTT Push-to-Talk
PTV Push-to-View
PTX Push-to-X
RAM Random Access Memory
ROM Read-Only Memory
SIP Session Initiation Protocol
SMS Short Message Service
TCP/IP Transmission Control Protocol/Internet Protocol
TDMA Time Division Multiple Access
UDP User Datagram Protocol
UFMID Urban Fleet Market Identifier
UMTS Universal Mobile Telecommunications System
URL Uniform Resource Locator
USB Universal Serial Bus
VoP Voice-over-Packet
WAN Wide Area Network
WAP Wireless Application Protocol
WiMax™ Worldwide Interoperability for Microwave Access Embodiments of the technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-executable instructions, data structures, program modules, and other data representations. Media examples include, but are not limited to information-delivery media, RAM, ROM, EEPROM, flash memory or other memory technology, CD-ROM, DVDs, holographic media or other optical disc storage, magnetic cassettes, magnetic tape, magnetic disk storage, and other magnetic storage devices. These technologies can store data momentarily, temporarily, or permanently.

To provide context for the detailed description of the inventions below, a brief overview of some embodiments of aspects of the inventions follows. To better illustrate the concepts, consider an illustrative use case involving a first and a second (fictitious) user: Annie and Bob. According to various embodiments of the invention, upon initial (or subsequent) configuration of a mobile device on a mobile network, Annie may be presented with options relating to a wireless-backup service similar to embodiments of the services described herein. For example, one option with which Annie may be presented is an option for opting in or out of the backup service. If Annie opts in, various configurations may be available to her. Although a wireless-backup service such as the one described herein can be utilized to backup any type of information, the backup of contact information is the only aspect germane to the present inventions, and therefore, other types of information backup is not discussed. Annie may opt in to the backup service and specify that she wishes for a set of contacts (referred to varyingly and interchangeably as "set of contacts" and "address book") associated with the mobile device to be backed up by the network. In so doing, Annie has authorized participation in the wireless-backup service. Accordingly, the network maintains a copy of Annie's address book.

During this initial setup, Annie can also be presented with an option for participating in a contact-reconciliation service (e.g., reciprocal-add services, forced removal services, etc.) described herein. Suppose that Annie subscribes to this service. In embodiments, as part of the subscription process, Annie can set preferences and permissions. In some embodiments, this process can be a stand-alone process handled by equipment and software so dedicated. In other embodiments, this process might be a part of an overall phone set-up process, portions or all of which can be handled by a device management server, which is not illustrated herein, as device management is well-known in the art.

In embodiments, Annie can set any number of different types of preferences such as, for example, how much of her contact information to expose to the network (and thus, other users), what types of contact information to expose, what types of other user's contact information to acquire during reciprocal-add processing. For example, Annie might not ever use her mobile device for sending e-mail or for participating in PTT communications, in which case, Annie might not want to save e-mail addresses and UFMIDs. Other types of preferences that Annie can set, in embodiments, include synchronization options and notification settings. For example, in some embodiments Annie can specify whether she wishes for synchronization to occur automatically, periodically, in response to certain types of events (e.g., update events), in response to a request from Annie, in response to a request from network administrators, and the like. Exemplary notification settings include triggers for notifications (e.g., specifying what types of events should result in a notification to Annie), types of communication vehicles for notifications (e.g., SMS, MMS, e-mail, voicemail, etc.), and the like. Furthermore, in various embodiments, Annie can set various types of permissions that allow her to manage the dissemination of her contact information such as, for example, by restricting exposure of her contact information to certain people, groups of people, situations, and the like. It will be appreciated by those aware of the art that any number of other configurations, settings, preferences, permissions, and the like can be managed during such a set-up process.

Additionally, for the purposes of this discussion, it will be assumed that Bob has also subscribed to a similar service through the same or a different mobile network. In any case, it is assumed, for the functionality of the inventions described herein, that one or more of the network components discussed is capable of accessing contact information corresponding to Bob and is capable of updating a remotely-stored copy of Bob's address book and causing such updates to be synchronized with the address book stored on Bob's mobile device. In some embodiments, the network can perform these actions directly, while in other cases, the network can cooperate with components of Bob's home network to achieve the functionality described herein.

Continuing with the example above, during or subsequent to the subscription process, an initial check can be performed to determine if any other mobile devices (whose address books are backed up on the network or are otherwise accessible to components of the network) have associated address books that include a contact corresponding to Annie. Of course, if Annie is setting up a new mobile device with a new number, the network likely will not identify any such mobile devices. However, if Annie is updating preferences, subscribing to a new service using an established device, setting up a new device having an old phone number, or the like, the system can, by searching the backup store, identify one or more additional mobile devices having address books with contacts corresponding to Annie in them. Upon identifying these mobile devices, in some embodiments, the system can notify Annie of the results of the search and provide Annie options for having contact information corresponding to the users of those mobile devices added to Annie's address book. In embodiments, Annie can, during the reciprocal-add conversation with the network, specify the types of contact information to acquire, the users whose contact information should be acquired, and the like.

Now suppose that Bob and Annie meet and wish to speak with each other again in the future. As is a common scenario today, Annie may hand her mobile device to Bob and invite Bob to enter his phone number, after which Annie will input a name (which need not necessarily be Bob's name, but rather is some identifier that Annie chooses to use to identify Bob in her address book) and save the name and phone number pair as a contact in her address book. In other scenarios, Bob may tell Annie his phone number while she enters it into her device, Annie may write down Bob's phone number and enter it into her device later, and the like, so long as Annie enters some contact information (e.g., phone number, e-mail address, etc.) corresponding to Bob to create a contact in her address book. From that time on, as is also typical today, Annie may communicate with Bob any number of times simply by searching for the name that she entered for the contact, selecting the contact, and, in embodiments, selecting a mode of communication, without ever seeing Bob's phone number again.

Assuming that Bob subscribes to a contact-reconciliation service as well, Bob receives a notification from the network that indicates that Annie added at least a portion of Bob's contact information to her address book. In embodiments, Bob can be provided with an inquiry as to whether any portion of Annie's contact information (to the extent that her contact information is available to Bob) should be added to Bob's address book. In some embodiments, this inquiry can be sent to Bob as a mobile message (e.g., an SMS message, an MMS message, an e-mail, etc.). Other forms of communication can be used as well. Bob can respond to the inquiry to either allow or prevent the addition of Annie's contact information to Bob's address book. In some embodiments, Bob can respond by sending a mobile message (e.g., replying) back to the network with an indication of his response to the inquiry. In another embodiment, if Bob's device is Web-enabled, the network can send Bob a mobile message containing a link to a Web page hosted by a WAP server. Upon selecting that link, a WAP browser on Bob's device interacts with the WAP server to navigate the reciprocal-add process. That is, the WAP server can provide a user interface to Bob that walks Bob through the process of allowing additions and deletions to a remotely-stored copy of his address book and the synchronizing of that copy with the address book on his device. In embodiments, the WAP server can be adapted to batch reciprocal-add requests, removal requests, notifications, and the like so that they can be managed during Bob's interaction with the WAP server.

Upon receiving a positive response to the inquiry from Bob, the network updates the remotely-stored copy of Bob's address book to include the desired contact information corresponding to Annie. Once updated, the remotely-stored copy of Bob's address book can be synchronized with the address book residing on Bob's device. Upon successful completion of any one or more of these actions, notifications can similarly be sent to Annie, informing her that Bob has added her to his phone book, and confirming that Annie has entered a correct phone number for Bob.

Additional functionalities as described in more detail below can be provided to Annie and Bob. For example, in one embodiment, Annie and Bob might have PTT-enabled devices that can engage in instant-connect communications over a network such as, for example, an iDEN network. In this case, Annie might have a phone number for Bob, but not an instant-connect identifier (e.g., UFMID) for him. Upon placing a voice phone call from Annie's device to Bob's device, Annie can cause a reciprocal-add procedure to be invoked. The network is capable of recognizing that Annie's mobile device and Bob's mobile device are both PTT-enabled, and in some cases, might even determine that Annie and Bob are physically located in a particular zone or the like.

Assuming that Annie's and Bob's preferences and permissions allow it, the network compares the address books associated with Annie and Bob and determines that, while Annie's address book includes a contact corresponding to Bob, that contact doesn't include a UFMID corresponding to Bob's mobile device. Accordingly, the network can send Annie a notification that includes an inquiry as to whether Bob's UFMID, discoverable by the network, should be added to Annie's address book. Upon receiving a positive response from Annie, Bob's UFMID can be added to the remotely-stored copy of Annie's address book and synchronized with her device, as described herein. In some embodiments, the network can also identify other remotely-stored copies of address books associated with other mobile devices to identify other users in the network, geographical location, user group, zone, or the like and thereby perform reciprocal-add procedures with respect to those other devices.

Another exemplary functionality enabled by embodiments of aspects of the inventions is a forced-removal service. In one embodiment, the network can force removal of contact information corresponding to a user whose user device is no longer active on the network (e.g., the account has been canceled and the phone number recaptured by the network). In this embodiment, for instance, if Bob fails to pay his bill, the network might cancel his mobile communications service and recapture (e.g., retire) his phone number and UFMID. Upon doing so, a notification of the recapture is provided to a contact-reconciler, which searches the database of backed-up address books to identify those address books that include contacts having contact information (e.g., a phone number and UFMID) corresponding to Bob's mobile device. The reconciler deletes the phone number and UFMID from each contact that includes one or the other and these updates are synchronized to the associated devices.

In other embodiments, a forced-removal process can be initiated in response to a request by a user or other entity. For example, suppose that Bob begins calling Annie often and at inappropriate times, refusing Annie's requests to stop. Annie can, in embodiments, file a formal complaint with her mobile communications service provider, who can force a removal of Annie's contact information from the remotely-stored copy of Bob's address book, even without notifying Bob. Upon synchronizing the update with Bob's mobile device, Bob no longer would be able to call Annie using a contact in his address book. This might be particularly effective in the case in which Bob has not otherwise memorized or recorded contact information corresponding to Annie.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Various memory components that memory 112 might take the form of have been previously described. Thus, further elaboration thereon is unnecessary here, only to say that memory component 112 can include any type of medium that is capable of storing information (e.g., a database). A database can be any collection of information. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as WiMax™ technology and also Long Term Evolution (LTE)). In some embodiments, radio 117 might also facilitate other types of wireless communications including Wi-Fi® communications, Bluetooth® communications, and GIS communications.

Input/output ports 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
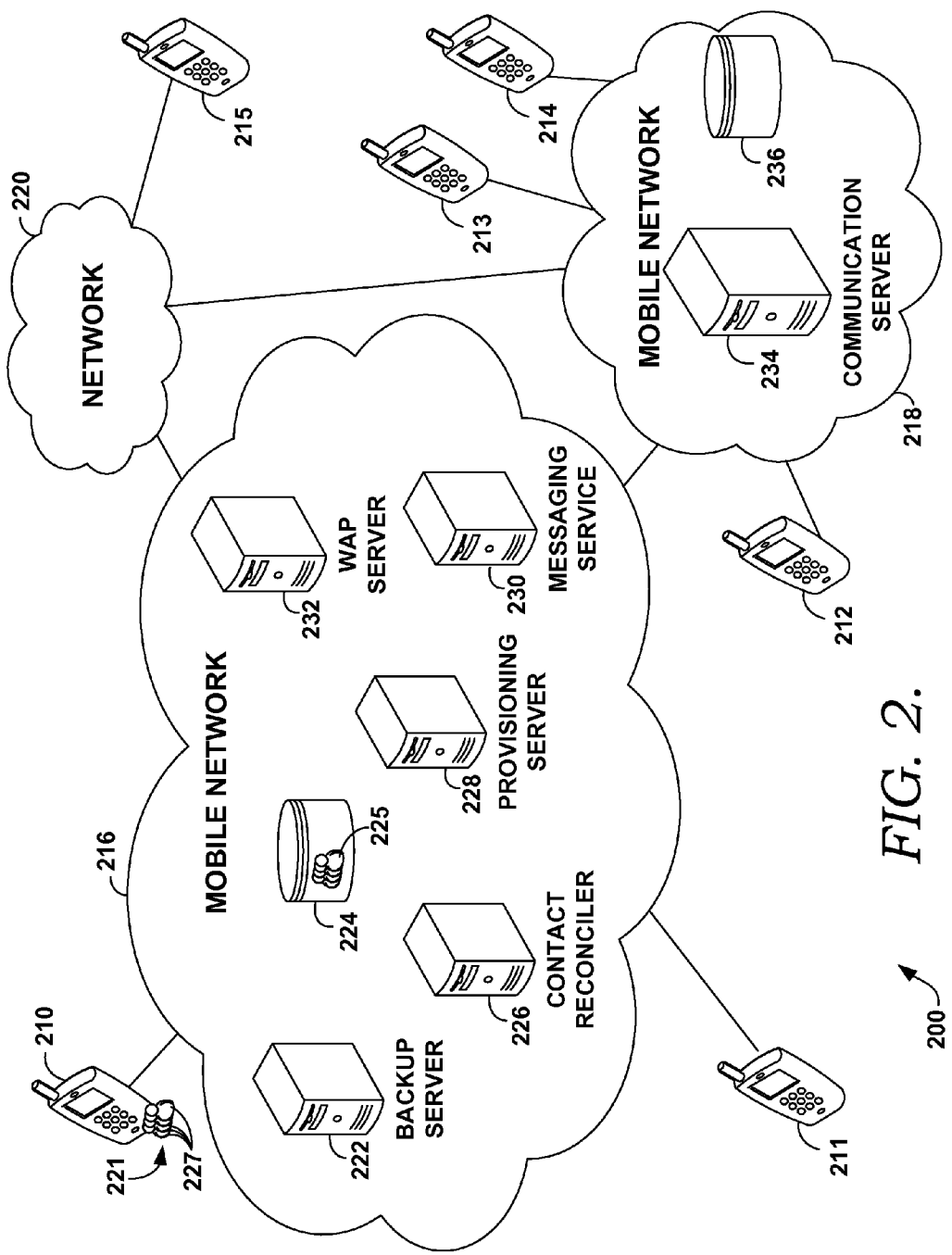
FIG. 2 depicts an illustrative network environment suitable for practicing embodiments of the inventions.

Turning now to FIG. 2, an illustrative network environment 200 suitable for practicing embodiments of the inventions is provided. Network environment 200 includes mobile devices 210, 211, 212, 213, 214, and 215; mobile networks 216 and 218; and network 220. According to various embodiments of the invention, mobile devices 210 and 211 can communicate, by way of mobile network 216, with one another, with other mobile devices 212, 213, 214, and 215, with computing devices (not shown), with land-line telephones (not shown), and with any number of various entities. Similarly, in some embodiments, mobile devices 212, 213, and 214 can communicate by way of mobile network 218 and mobile device 220 can communicate by way of network 220.

The exemplary network environment 200 shown in FIG. 2 is an example of one suitable network environment 200 and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, in various embodiments, components of mobile networks 216 and 218 can be implemented in any number of configurations, using any number of machines, and the like.

In embodiments, other arrangements and elements (e.g., machines, components, interfaces, functions, orders, servers, databases, etc.) can be used in addition to, or instead of, those shown and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions can be carried out by a processor executing instructions stored in memory.

It should be understood by those aware of the art that each of these elements of the network environment 200 is also scalable. That is, for example, network environment 200 can include a large number of mobile devices. Additionally, for example, mobile networks 216 and 218 may actually each include a number of network elements 222, 224, 226, 228, 230, 232, 234, and 236. Any or all of these network elements 222, 224, 226, 228, 230, 232, 234, and 236 may be implemented using any number of server modules, devices, machines, and the like. In some embodiments, mobile devices 210, 211, 212, 213, 214, and 215 communicate via a common network such as mobile network 216 or 218 and in other embodiments, mobile devices 210, 211, 212, 213, 214, and 215 communicate via multiple networks 216, 218, and 220. In various embodiments, mobile devices 210, 211, 212, 213, 214, and 215 can communicate with each other using cellular telephony (e.g., CDMA), mobile messaging, instant-connect services, and the like.

As shown in FIG. 2, mobile network 216 includes a backup server 222, a data store 224, a contact reconciler 226, a provisioning server 228, a messaging service 230, and a WAP server 232. In various embodiments, mobile network 216 can include additional components, as well. Although each of the components 222, 224, 226, 228, 230, and 232 of mobile network 216 are illustrated as being independent, this depiction is intended for clarity and understanding and not to impose any requirement on the configuration of a mobile network 216 suitable for implementation of embodiments of the inventions. That is, for example, in an embodiment, contact reconciler 226 may be integrated with backup server 222, or one or more other components, whether or not illustrated in FIG. 2. Additionally, in embodiments, mobile network 216 may include more than one data store 224, and the like.

As is further illustrated in FIG. 2, mobile network 218 includes a communication server 234 and a data store 236. As with the exemplary depiction of mobile network 216 discussed above, this depiction is intended for clarity and understanding and not to impose any requirement on the configuration of a mobile network 218 suitable for implementation of embodiments of the inventions. Mobile networks 216 and 218 can be any type of mobile networks, using any type of suitable communication protocol. Illustrative protocols that can be utilized in connection with embodiments of the present invention include CDMA, EDGE, EV-DO, GPRS, GSM, iDEN, UMTS, Wi-Fi®, WiMAX™, and the like. In an embodiment, mobile network 216 includes, for example, both CDMA and iDEN services and may, in embodiments, include a communication server 234. In other embodiments, mobile network 218 can be associated with mobile network 216 and can include "instant-connect" services, as described more fully below, for users of mobile network 216. Additionally, although mobile network 218 is illustrated as including only one server—communication server 234—it should be understood that mobile network 218 can include any number of additional servers and services such as full-duplex voice communications, any number of push-to-x applications, data services, multimedia services (e.g., IMS subsystems, etc.), and the like.

With continued reference to FIG. 2, network 220 can, in embodiments of the inventions, be any type of network such as, for example, the Internet, a LAN, a WAN, a wireless LAN (WLAN), a mobile network (MN), a PTSN, or the like. In embodiments, any combination of mobile devices 210, 211, 212, 213, 214, and 215 can communicate over network 220. In some embodiments, for example, mobile devices 210 and 211 can communicate, via mobile network 216, over network 220 to communicate with mobile device 215, and further through network 218 to interact with mobile devices 212, 213, and 214. In other embodiments, mobile devices 210, 211, 212, 213, 214, and 215 can communicate, via network 220, with WAP server 232. It will be readily appreciated that any number of other communications, devices, and the like, may be facilitated using an implementation in accordance with variations of the illustrative network environment 200.

In embodiments of the inventions, mobile devices 210, 211, 212, 213, 214, and 215 can be any kind of mobile communications device that includes radio equipment that facilitates the transmission of wireless communication signals to and from mobile devices 210, 211, 212, 213, 214, and 215, for instance, over mobile networks 216 and 218. Radio equipment can facilitate wireless communications between mobile device 210, 211, 212, 213, 214, and 215 and a local, regional, national, or even global, telecommunications network. According to various embodiments of the invention, mobile devices 210, 211, 212, 213, 214, and 215 include computer-readable media 112 on which is embodied computer-executable instructions 113 that, when executed by a processor 114 disposed within mobile device 210, 211, 212, 213, 214, and 215, cause mobile device 210, 211, 212, 213, 214, and 215 to perform various methods, tasks, functions, and the like, such as the illustrative methods, tasks, and functions described herein.

In embodiments, mobile device 210, 211, 212, 213, 214, and 215 can be a mobile phone, a PDA, a smart phone, a laptop computing device, a mobile computer, and the like. Mobile devices 210, 211, 212, 213, 214, and 215 are capable of transmitting and/or receiving one or more forms of communications. Examples of communications that can be transmitted and/or received include voice-calls, text messages, multimedia messages, e-mails, calendar updates, task reminders, push-to-x interactions (e.g., push-to-talk (PTT), push-to-video (PTV), push-to-locate (PTL), etc.), and the like.

As illustrated in FIG. 2, mobile device 210 includes a set 221 of contacts 227. In embodiments, the set 221 of contacts 227 may be referred to, for example, as an address book. The set 221 of contacts 227 includes one or more contacts 227, although if there are no contacts in the set 221 of contacts 227, the application may still exist, but will have memory allocated for storing contacts. As the term is used herein, a "contact" is an entry in a set of contacts such as, for example, an address book. A contact can include any type of contact information. Contact information is any information associated with a contact such as, for example, a name, an alias, a phone number, an address, a UFMID, an e-mail address, a fax number, and the like.

In embodiments, a set 221 of contacts 227 stores contact information in a database for retrieval by the user of mobile device 210. The user may be, for example, a person, an institution, a business, or any other entity. The user can often search the set 221 of contacts 227 for a name, phone number, or other contact information. Once the user obtains the desired information, the user may utilize the contact information for a variety of purposes such as, for example, communicating with another user of the network 216 or some other network 216 or 220. It should be appreciated by those aware of the relevant disciplines that the set 221 of contacts 227 can reside entirely on a mobile device 210 or can be provided as a network service by mobile network 216, in which case the set 221 of contacts 227 resides in a data store 224 on the network 216. In some embodiments, portions of the set 221 of contacts 227 can be stored on the mobile device 210, while other portions can be stored on the network 216. In still further embodiments, a set 221 of contacts 227 may reside on a mobile device 210, while a copy of the set 221 of contacts 227 is maintained in a data store 224 on the network 216 as a backup. In this latter embodiment, a copy of the set 221 of contacts 227 is retrieved for backing-up by a backup server 222 located on the network 216.

Backup server 222 is equipped with hardware and logic (e.g., a processor, computer-readable media and computer-executable instructions stored on the computer-readable media) that allows for wireless backup of information stored on any of the mobile devices 210, 211, 212, 213, 214, and 215 that subscribe to an associated backup service. In various embodiments, backup server 222 retrieves information (e.g., a set 221 of contacts 227) from a mobile device 210 and stores a copy 225 of the set 221 of contacts 227 in a data store 224.

Data store 224 could be combined with other data stores or could be distributed and/or integrated into one or more other entities, whether or not shown. Data store 224 can also take various forms. For instance, a data store could be a database, a database cluster, a list of data, a table of data, or a more complex relational database or directory structure, stored in a computer-readable medium such as computer memory or magnetic or optical disk drives, and the like. In an embodiment, data store 224 can include a backup database for storing copies of sets of contacts, a profiles database for storing user profiles, a preferences database for storing user preferences, a permissions database for storing user permissions, and the like. Of course, any combination, arrangement, or configuration of these and other storage components are contemplated as falling within the ambit of the present technology.

Backup server 222 can be equipped with any number of functions for handling information stored in data store 224. Examples of such functions include, without limitation, managing, searching, indexing, communicating, referencing, and the like. In some embodiments, backup server 222 is integrated with contact reconciler 226 or some other network component, whether or not shown. In other embodiments, backup server 222 is a distinct entity. According to various embodiments of the present inventions, backup server 222 is configured to detect an occurrence of an update event and provide an indication of that occurrence to contact reconciler 226. As used herein, an "update event" includes any event associated with a user, mobile device, network account, service, or the like, that triggers initiation of at least some aspects of the reconciliation processes and services described herein.

Contact reconciler 226 initiates contact-reconciliation services such as, for example, reciprocal-add services, forced-removal services, and the like, in response to receiving an indication of an occurrence of an update event. In embodiments, contact reconciler 226 can be embodied as a server, a program module, a function, an application, an API, or the like. In embodiments, contact reconciler can be integrated with any combination of other network components such as, for example, backup server 222. In some embodiments, contact reconciler is a distinct function or server. Contact reconciler 226 is capable of initiating the activities described herein in response to receiving an indication of an occurrence of an update event. In some embodiments, contact reconciler 226 includes technology for monitoring network events and determining when an event constitutes an update event. In other embodiments, backup server 222 or some other component monitors events and provides notifications to reconciler 226.

Contact reconciler 226 accesses preferences, permissions, and other settings information associated with mobile devices 210, 211, 212, 213, 214, and 215 responsive to an occurrence of an update event to determine whether the mobile devices 210, 211, 212, 213, 214, and 215 subscribe to contact-reconciliation services and to ascertain the constraints thereof, as illustrated in the discussions herein. To the extent authorized by users of mobile devices 210, 211, 212, 213, 214, and 215, contact reconciler 226 is adapted to reference remotely-stored copies 225 of sets 221 of contacts 227 (which may, for instance, be stored in data store 224). In embodiments, contact reconciler 226 can perform any number of operations with respect to information in data store 224 such as, for example, searching, indexing, sorting, copying, deleting, adding, and the like. In an embodiment, contact reconciler 226 interacts with another network component such as backup server 222 to perform such operations.

With continued reference to FIG. 2, contact reconciler 226 is adapted to compare remotely-stored copies of sets of contacts to determine whether contact information corresponding to a particular user is not included, but is available. Accordingly, contact reconciler 226 can generate notifications, selectable options, and the like for inviting users to utilize contact-reconciliation services. In embodiments, contact reconciler is capable of updating contact information stored in a copy of a set of contacts, of providing notifications to users. In some embodiments, contact reconciler 226 also can interact with WAP server 232 to facilitate user-guided contact-reconciliation services. In other embodiments, contact reconciler can perform any number of other functions as well. Furthermore, in various embodiments, contact reconciler 226 provides updated information to provisioning server 228 for synchronization with the corresponding mobile device.

Provisioning server 228 receives updated contact information from contact reconciler 226 and facilitates synchronizing the same with an associated mobile device. In embodiments, provisioning server 228 facilitates over-the-air (OTA) provisioning and configuration for mobile devices 210, 211 (and, depending on the particular configuration of the network environment, mobile devices 212, 213, 214, and 215) such as, for example, by employing device management protocols like OMA-DM, which relies on technology such as SyncML® for performing synchronization operations with mobile devices 210, 211, 212, 213, 214, and 215. In embodiments, provisioning server 228 can be implemented on any number of computing devices, distributed computing systems, server banks, and the like. In some embodiments, provisioning server 228 facilitates device configuration, software upgrades, contact information updates, permissions and policies management functions, and the like. Furthermore, as explained previously, provisioning server 228 can be configured to allow users to specify preferences related to synchronization and other provisioning activities and the like.

Messaging service 230 is equipped with hardware and logic to be able to host and manage mobile messaging communications and applications. A mobile message, as used herein, refers to a communicative message (including, e.g., text, images, audio, and/or video) sent by or to a mobile device. Examples of mobile messages include, without limitation, electronic-mail (e-mail) messages, short message service (SMS) messages, multimedia messaging service (MMS) messages, voice-mail messages, and the like. Messaging service 322 includes software and transceivers configured to host mobile messages and messaging services. According to embodiments of the invention, messaging service 322 can be configured to transfer and receive mobile messages using any communications protocol such as, for example, TCP/IP, UDP, and the like. In embodiments, some mobile messages (e.g., SMS, MMS, e-mail, etc.) can be sent using the TCP/IP protocol, and in embodiments, other types of messages (e.g., voice-mail messages) can be sent using UDP.

According to embodiments of the invention, contact reconciler 226 communicates notifications, inquiries, URL links, and the like, to mobile devices 210, 211, 212, 213, 214, and 215 using a mobile messaging service 230. For example, consider the example above, in which Annie adds Bob's phone number to her address book. Upon updating the remotely-stored copy of Annie's address book and determining that Bob's address book does not include contact information for Annie, the contact reconciler can, in embodiments, communicate a mobile message (e.g., SMS message, MMS message, etc.) to Bob's mobile device to notify Bob that Annie has added Bob's phone number to her address book and to inquire whether Bob wishes for Annie's phone number to be added to his address book. Bob can initiate the reconciliation process (e.g., instruct the network to add contact information corresponding to Annie to Bob's address book) by replying with a mobile message. These communications are, according to embodiments, enabled by messaging service 230. In an embodiment, a mobile message can include a URL or link to a Web page such as, for example, a Web page provided by WAP server 232.

WAP server 232 utilizes wireless application protocol (WAP) to enable Internet access by mobile devices 210, 211, 212, 213, 214, and 215. As is further discussed below with reference to FIG. 3, WAP server 232 provides a Web page that facilitates performance of various aspects of the methods and processes described herein. For instance, in an embodiment, upon updating a remotely-stored copy of a first set of contacts, which is associated with a first user's mobile device, contact reconciler 226 sends a notification to a second mobile device so as to inform the user associated with the second mobile device that the remotely-stored copy of the first set of contacts has been updated. In embodiments, the notification can also include a link (e.g., a hyperlink or other link to a URL, etc.) that, upon selection by the second user, directs the second user to a Web page, where the second user can walk through the process of adding contact information to a remotely-stored second set of contacts associated with the second mobile device. In embodiments, the notification can be a mobile message (e.g., SMS, MMS, e-mail, etc.) that includes some text informing the second user of the update to the first set of contacts and that further includes a link to the Web page. Upon a user's selection of the link, the mobile device is redirected to the Web page where the user can interact with a user interface provided by WAP server 232 to navigate a contact-reconciliation process.

With continued reference to FIG. 2 and to mobile network 218, in particular, communication server 234 is equipped with hardware and logic to be able to set up media communications with between any of mobile devices 212, 213, and 214 so as to allow users of the mobile devices 212, 213, and 214 to communicate with each other. As such, communication server 234 may be programmed to engage in signaling communications according to SIP or another designated protocol, in order to set up a conference between each participating mobile device 212, 213, and 214. In embodiments, communication server 234 may be programmed to receive and send media streams according to RTP or another designated protocol. In embodiments, communication server 234 can be a discrete entity, such as a multipoint conference unit (MCU). In other embodiments, communication server 234 can include a number of components such as, for example, (i) a SIP user agent application to set up communication sessions, (ii) an RTP application to facilitate sending and receiving real-time media, and (iii) bridging logic to bridge together sessions between multiple users so that the users can communicate with each other. Other arrangements, as known in the art, are possible as well.

Communication server 234 may use packet-based media conferencing to provide an "instant-connect" service, where a user of one mobile device can readily initiate a real-time media conference with one or more designated target users of other mobile devices. The initiating user may simply select a contact or contacts corresponding to a target user or group from a set of contacts stored on the user's mobile device and then press an instant-connect button on the user's mobile device. The user's device would responsively signal to the communication server 234 and cause the server to initiate a conference between the initiating user and the selected user or group. This sort of service is referred to as "instant connect" because it strives to provide a quick connection between two or more users, in contrast, for example, to a telephone service where a user dials a telephone number of a party and waits for a circuit connection to be established with that party.

An example of an instant-connect service is commonly known as "push-to-talk" (PTT). In a PTT system, some or all of mobile stations of a conference are likely to be wireless devices that are equipped to establish wireless packet-data connectivity and, in some cases, to engage in voice-over-packet (VoP) communication. Alternatively, some or all of the mobile devices could be other sorts of devices such as, for example, multimedia personal computers or Ethernet-telephones, that can establish packet data connectivity and engage in VoP communication through landline connections. Further, each device could be equipped with a PTT button or other mechanism that a user can engage in order to initiate a PTT session or to request the floor during an ongoing session. Additional examples of instant-connect services include instant video communication ("push-to-view" (PTV)), and other sorts of instant communications, generally known as "push-to-x" (PTX).

In embodiments of the invention, communication server 234 interacts with data store 236, in which it stores instant-connect identifiers corresponding to mobile devices 212, 213, and 214. As used herein, an "instant-connect identifier" includes any identifier, address, destination, and the like that can be used to establish an instant-connect service communication between two or more mobile devices. For instance, in an embodiment, an instant-connect identifier can be an urban fleet market identifier (UFMID). Communication server 234 can use the instant-connect identifiers to facilitate establishment of communication between the devices. In some embodiments, data store 236 can be integrated with another data store such as, for example, data store 224.

In embodiments, a set of contacts associated with a mobile device may include a subset of instant-connect identifiers. In other embodiments, instant-connect identifiers are portions of contact information corresponding to users and stored within contacts in the set of contacts. In other embodiments, mobile devices may maintain separate sets of instant-connect identifiers, which are maintained independently from other sets of contacts. Accordingly, in various embodiments, data store 236 may be a backup store, managed by backup server 222, while in other embodiments, data store 236 may be distinct and unique to an instant-connect service, and therefore managed by communication server 234.

Figure 3:
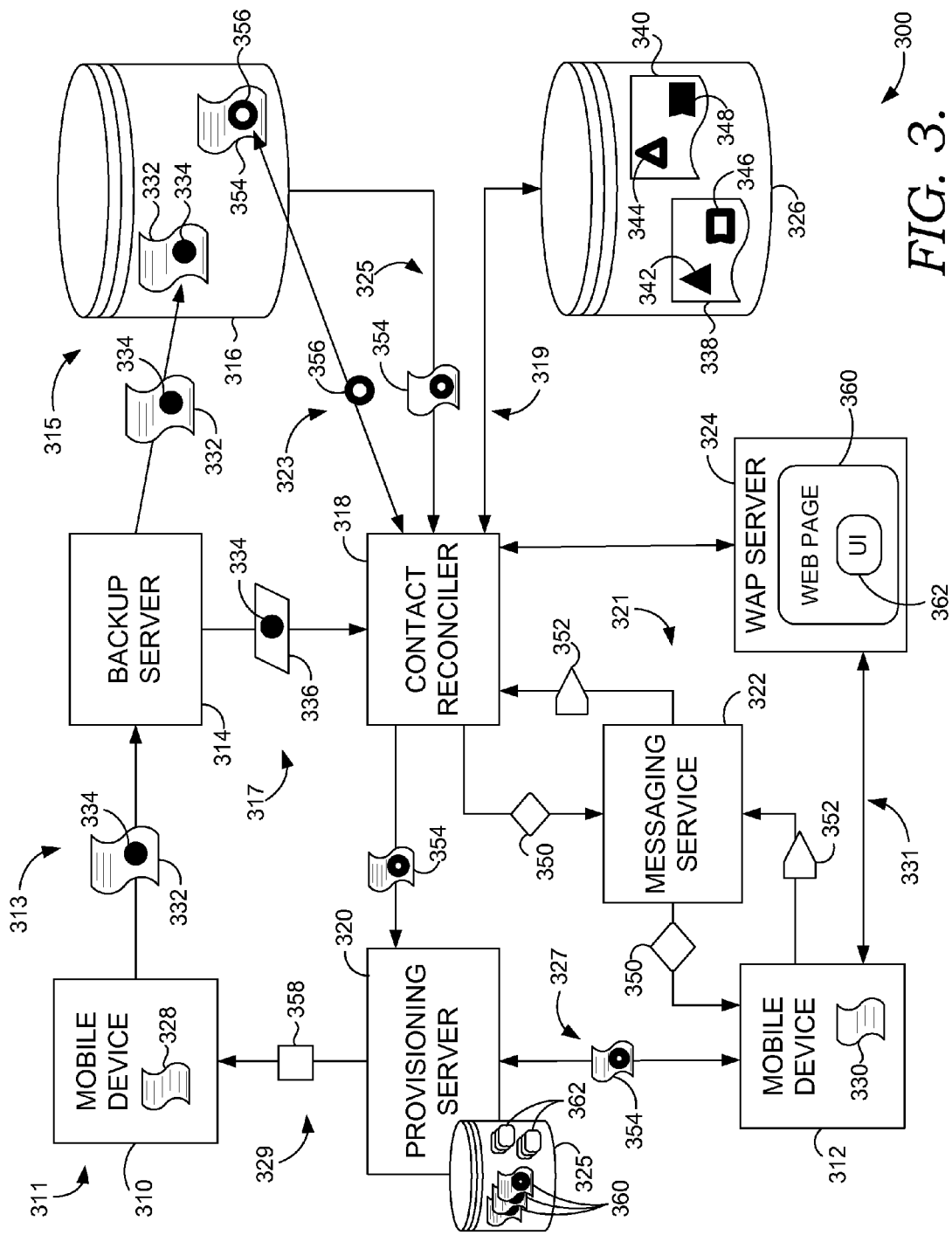
FIG. 3 depicts an illustrative implementation of an embodiment of the inventions.

Turning now to FIG. 3, an illustrative implementation 300 of the inventions is shown using a schematic block diagram. The illustrative implementation 300 includes processes for reconciling contact information associated with mobile devices. As shown in FIG. 3, the operating environment utilized in illustrative implementation 300 includes mobile devices 310 and 312, backup server 314, backup store 316, contact reconciler 318, provisioning server 320, messaging service 322, WAP server 324, and data store 326. The illustrative implementation 300 shown in FIG. 3 is an example of one suitable implementation 300 and is not intended to suggest any limitation as to the scope of use or functionality of embodiments of the inventions disclosed throughout this document. Neither should the illustrative implementation 300 be interpreted as having any dependency or requirement related to any single component or combination of components illustrated therein. Moreover, for the purposes of the present discussion, mobile devices 310 and 312, backup server 314, contact reconciler 318, provisioning server 320, messaging service 322, WAP server 324, and data stores 316 and 326 are similar to the corresponding components described with reference to FIG. 2 and, therefore, further elaboration is not necessary.

Mobile devices 310 and 312 are wireless communication devices adapted to receive communications and media over wireless networks (e.g., mobile networks) and may include any number of components, features, and aspects that are not shown in FIG. 3 so as not to obscure a clear understanding of embodiments of the present inventions. Mobile devices 310 and 312 each include a set of contacts, referred to generally by numerals 328 and 330, respectively. The set of contacts can 328 and 330 can include contact information, annotations, graphics, audio, video, and any number of other types of content. In embodiments, a set of contacts may be referred to as an address book, a contact list, a buddy list, or the like. Each contact stored in the set of contacts 328 and 330 has contact information associated with it. Illustrative contact information can include, for example, names, phone numbers, e-mail addresses, URLs, street addresses, fax numbers, UFMIDs, and the like. In an embodiment, the contact information can be inputted by a user, retrieved from a communication, downloaded from a website or other server, or the like.

According to some embodiments, the set of contacts 328 and 330 is stored on the mobile device 328 and 330. In other embodiments, the set of contacts can be stored on the network such as, for example, in the case of a network address book. In some embodiments, a user might have locally stored contact information (e.g., a set of contacts) on the user's mobile device, but also might utilize a network address book. The network address book, in various embodiments, can be associated with any number of different components of a mobile network.

In situations in which a network address book or other set of contacts maintained on the network is utilized, the processes described herein would be similar with respect to updating the remotely-stored (with respect to the corresponding mobile device) set of contacts, but in some cases, may not include synchronizing the remotely-stored set of contacts with a set of contacts on the device and may not include the backup processes described herein. However, other functionality would be similar such as, for example, receiving indications of update-event occurrences, updating a set of contacts, notifying another user of the update-event and inquiring whether the other user wishes for a set of contacts associated with the other user to be updated accordingly, forcing contact information removal, and the like.

An illustrative operation of an embodiment of the present invention can begin, as indicated in FIG. 3 at numeral 311, with a user of mobile device 310 updating (e.g., adding, deleting, etc.) contact information corresponding to a user of mobile device 312. As indicated at 313, backup server 312 retrieves a copy 332 of the set 328 of contacts, which includes the updated portion 334 of contact information corresponding to mobile device 312. Backup server stores the copy 332 in backup store 316, as indicated by numeral 315. In various embodiments of the inventions, updating a set of contacts is an update event and, accordingly, backup server 314 provides an indication 336 of the occurrence of the update event to contact reconciler 318, as illustrated at 317. In embodiments, the indication 336 includes the updated contact information 334, while in other embodiments, contact reconciler 318 accesses backup store 316 (directly, or through backup server 314 to access the updated contact information 334.

As indicated at numeral 319, contact reconciler references configuration settings 338 and 340, which are associated with mobile devices 310 and 312, respectively. As shown in the illustrative embodiment of FIG. 3, configuration settings 338 and 340 include preferences 342 and 344, as well as permissions 346 and 348. In some embodiments, data store 326 and/or its contents can be integrated with backup store 316. In other embodiments, configuration settings can be stored in a user or device profile in a profile database, and the like. The particulars of the configuration settings 338 and 340 govern the nature of the remaining aspects of the illustrated process.

Subject to the configuration settings 338 and 340, contact reconciler 318 provides a notification 350 to mobile device 312, as referenced by numeral 321. In embodiments, the notification includes an indication that contact information corresponding to mobile device 312 has been updated, added, deleted, or the like. In embodiments, notification 350 includes an inquiry as to whether contact information corresponding to the user of mobile device 310 should be added to mobile device 312. In embodiments, notification 350 can take the form of a mobile message, the communication of which is facilitated by messaging service 322. Similarly, a response 352 to the inquiry can be communicated to contact reconciler 318 via messaging service 322. In an embodiment, notification 352 includes a link to a web page 360 hosted by WAP server 324 such that, upon selection of the link, mobile device 312 interacts with WAP server 324 to navigate the contact— reconciling service offerings by way of a UI 362 provided WAP server 324. These interactions are referenced by numeral 331.

As shown at numeral, 323, contact information 356 corresponding to mobile device 310 is identified and, subject to the conversation depicted at 321, added to the stored copy 354 of the set 330 of contacts associated with mobile device 312. In other embodiments, identified contact information 356 is removed from the stored copy 354 of the set 330 of contacts associated with mobile device 312 and, in further embodiments, other types of updates can be made.

As indicated by numerals 325 and 327, contact reconciler 318 provides the updated copy 354 of the set 330 of contacts, which now includes at least a portion 356 of contact information corresponding to mobile device 310, to provisioning server 320 for synchronization with the set 330 of contacts on mobile device 312. In embodiments, contact reconciler 318 provides a copy of the copy 354 to provisioning server 320 for synchronization, while in other embodiments contact reconciler 318 can interact with backup store 316 and provisioning server 320 in other manners to achieve synchronization such as, for example, by exposing an API to provisioning server 320, allowing provisioning server to access backup store 316, or the like. According to embodiments of the invention, a user associated with mobile device 312 can establish preferences with respect to synchronization, as discussed previously.

In some embodiments, as illustrated in FIG. 3, provisioning server 320 includes (or is connected to and can access) a database 325. In embodiments, the database 325 can be integrated with provisioning server 320, can be separate from provisioning server 320 and can take any number of various forms such as, for example, a database, a cache, and the like. According to various embodiments of the invention, database 325 can be used to store updated copies 360 of sets of contacts. In this manner, updates to sets of contacts can be batched and synchronized with the device 312 in groups. In some embodiments, the database 325 can also include other device updates 362 such as those utilized in managing the device 312 and the like.

Furthermore, as indicated by numeral 329, some embodiments include providing mobile device 310 with a notification 358 that indicates the occurrence of the reciprocal-add process just described, confirmation of the accuracy of the contact information 334 entered by the user of mobile device 310, and/or any other information. As with other notifications discussed herein, notification 358 can take any number of forms and can be subject to preferences and permissions established by the user of mobile device 310, and in some embodiments, by the user of mobile device 312. It should be appreciated by those aware of aspects of the art that the operation exemplified in FIG. 3 is only one of many various configurations and arrangements of the components and actions performed thereby that are contemplated as falling within the ambit of the present inventions.

Figure 4:
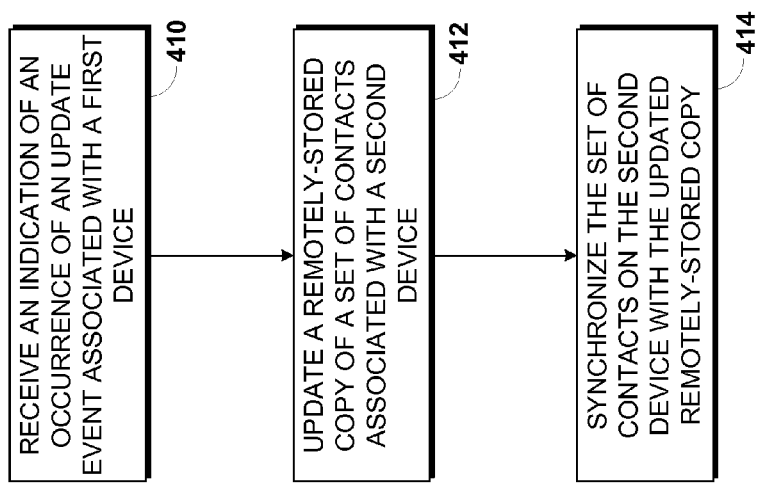
FIG. 4 is a flow diagram depicting an illustrative method of reconciling contact information in accordance with embodiments of the inventions.

To recapitulate, embodiments of the inventions have been disclosed in the context of computer-readable media, a communications device, a network environment, and methods for reconciling contact information between devices. Turning to FIG. 4, a flow diagram is provided, showing an illustrative method 400 of reconciling information contained in a first set of contacts on a first mobile device with a second set of contacts on a second mobile device in response to an event associated with the first mobile device. At a first illustrative step, step 410, an indication of an occurrence of an update event associated with the first mobile device is received. In some embodiments, the indication of an occurrence of an update event includes the actual update event itself, while in other embodiments, the indication does not include the actual update event. According to some embodiments, the indication indicates that a new contact has been added to the first set of contacts and, according to other embodiments, the indication indicates that a contact has been removed from the first set of contacts. In further embodiments, the indication indicates that a portion of contact information associated with the first mobile device is to be disassociated with the first mobile device such as, for example, upon recapture of a phone number by the network. Similarly, according to various embodiments, update events can include any number of types of events such as, for example, phone call initiations from one mobile device to another, updates to sets of contacts residing on mobile devices, and the like.

At a second illustrative step, step 412, a remotely-stored copy of the second set of contacts is updated based on the update event. At a final illustrative step, step 414, the mobile network synchronizes the second set of contacts with the remotely-stored copy of the second set of contacts such that the second set of contacts is updated based on the update event. As previously explained, embodiments of the inventions include providing a notification to the second mobile device to inform the second user of the update event. In some embodiments, that notification includes a selectable option for allowing the stored copy of the second set of contents to be updated.

Figure 5:
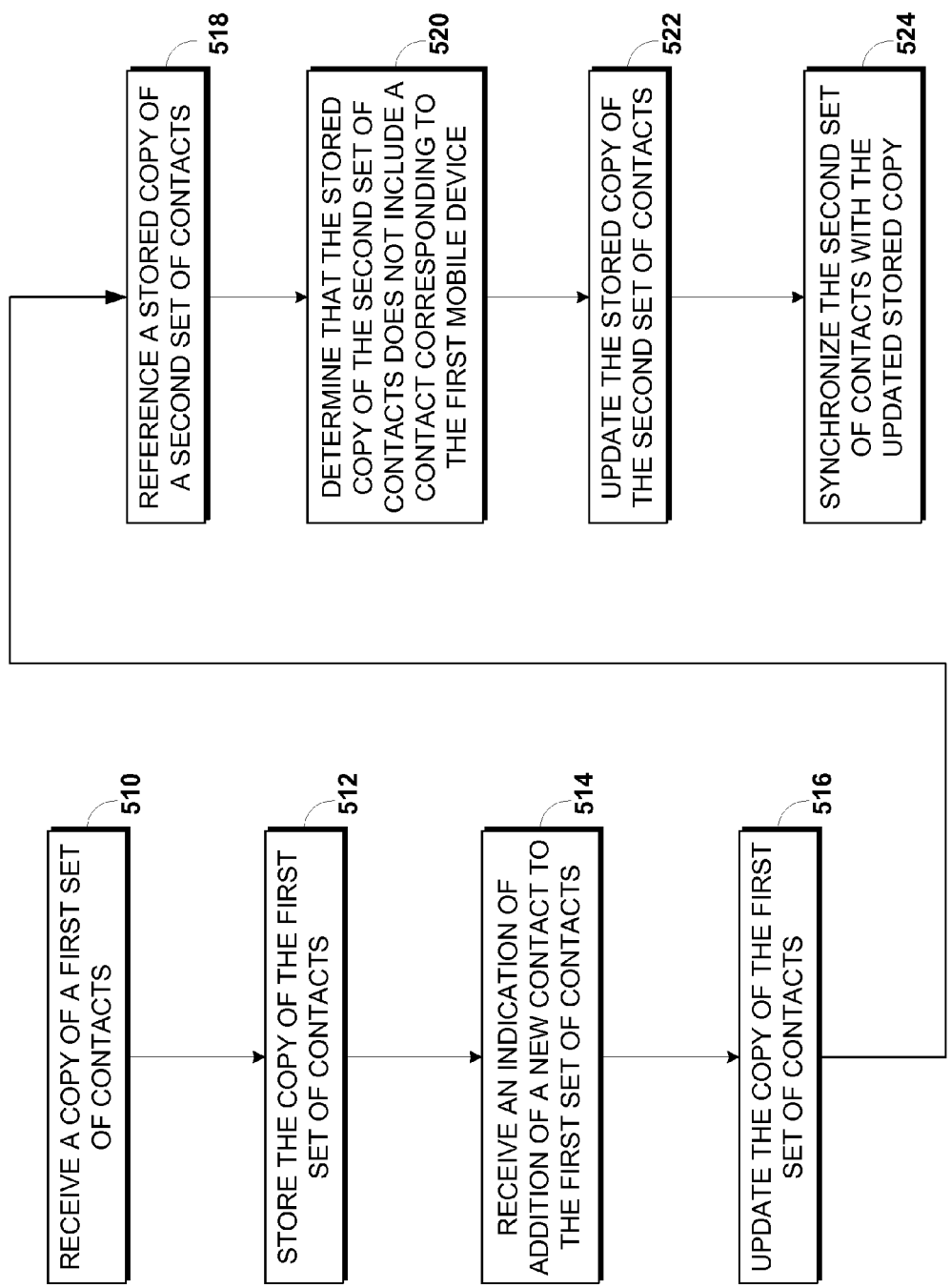
FIG. 5 is another flow diagram depicting an illustrative method of reconciling contact information in accordance with embodiments of the inventions.

Turning now to FIG. 5, another flow diagram is provided and shows an illustrative method 500 of synchronizing contact information. At a first illustrative step, step 510, a copy of a first set of contacts is received from a first mobile device associated with a first user. According to various embodiments of the inventions, each contact of the first set of contacts includes contact information. As explained above, contact information can include names, phone numbers, e-mail addresses, UFMIDs, and the like. At step 512, the copy of the first set of contacts is stored in a database that is remote from the mobile devices.

At step 514, a contact reconciler receives an indication that the first set of contacts has been updated to include a new contact. In embodiments, the new contact corresponds to a second user having an associated second mobile device and the new contact includes contact information corresponding to the second user. At step 516, the remotely-stored copy of the first set of contacts is updated to include the new contact. In some embodiments, the illustrative method includes providing a notification to the second mobile device to inform the second user of the update event. At step 518, the contact reconciler references a remotely-stored copy of a second set of contacts, which is associated with the second user and, as shown at step 520, determines that the remotely-stored copy of the second set of contacts does not include a contact corresponding to the first user. In some embodiments, the contact reconciler may, instead, determine that the remotely-stored copy of the second set of contacts does include a contact corresponding to the first user, but that the contact does not include some portion of contact information corresponding to the first user that is available to be added to the second set of contacts.

At step 522, the remotely-stored copy of the second set of contacts is updated to include a contact corresponding to the first user. In embodiments, the illustrative method includes first providing a notification to the second mobile device to inform the second user of the update event. In some embodiments, the notification includes a selectable option for allowing the remotely-stored copy of the second set of contacts to be updated. Upon a user selection of the option, a positive response to an inquiry, or other trigger, the remotely-stored copy of the second set of contacts is updated. At a final illustrative step, step 524, the network synchronizes the second set of contacts with the updated remotely-stored copy of the second set of contacts such that the second set of contacts is updated to include the contact corresponding to the first user.

Figure 6:
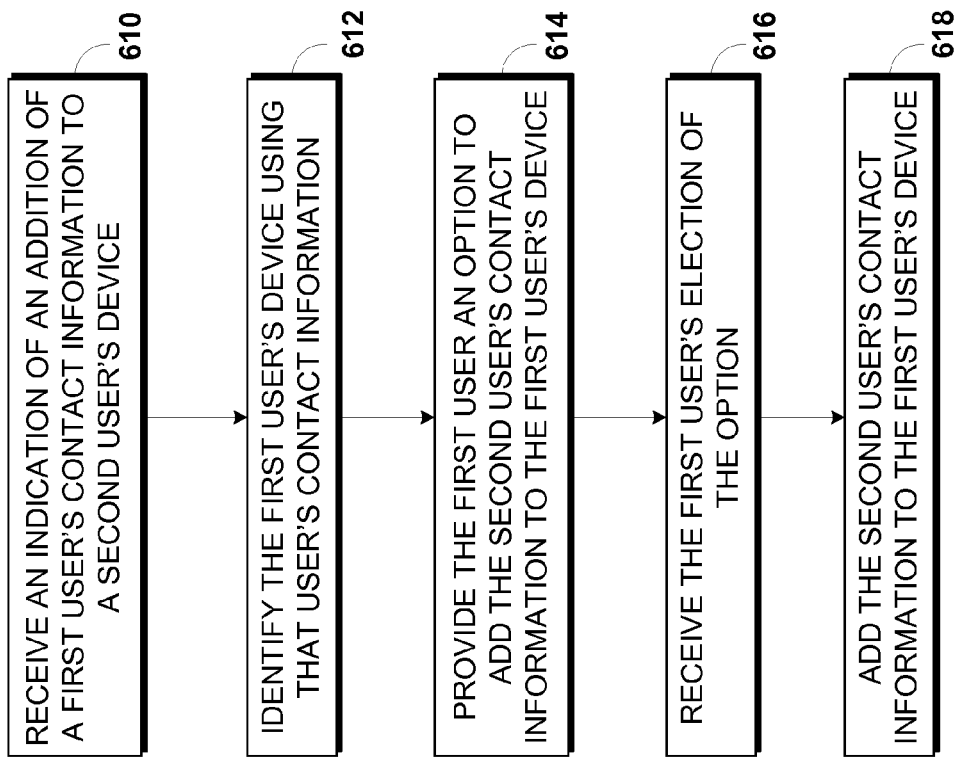
FIG. 6 is another flow diagram depicting an illustrative method of reconciling contact information in accordance with embodiments of the invention.

Turning to FIG. 6, another flow diagram is provided and shows an illustrative method 600 of reconciling contact information between a first mobile device that is associated with a first user having a corresponding set of first contact information and a second mobile device that is associated with a second user and a corresponding set of second contact information. At a first illustrative step, step 610, an indication is received that indicates that at least a portion of the first contact information has been added to the second mobile device. In embodiments, a portion of contact information can refer, for example, to a phone number, a UFMID, an e-mail address, a name, or the like.

At a step 612, a network component such as a contact reconciler identifies the first mobile device by using the first contact information and at a final illustrative step, step 614, an inquiry is provided to the first mobile device asking whether at least a portion of the second set of contact information is to be added to the first mobile device. Of course, upon a positive response to the inquiry, one or more of the reconciliation processes described above are performed.

Figure 7:
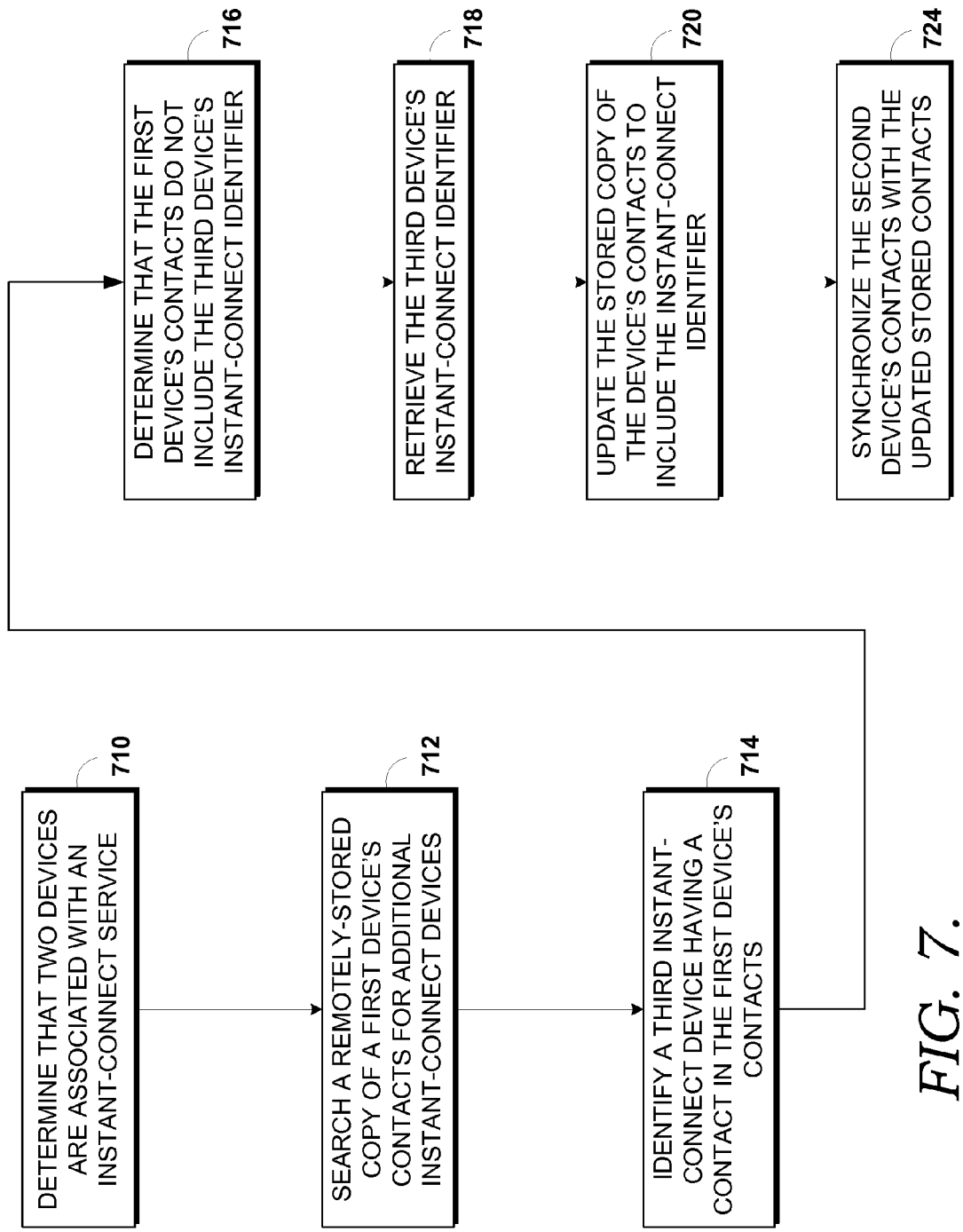
FIG. 7 is another flow diagram depicting an illustrative method of reconciling contact information associated with an instant-connect service in accordance with embodiments of the inventions.

Turning to FIG. 7, a flow diagram is provided and shows an illustrative method 700 of reconciling contact information between mobile devices associated with an instant-connect service. At a first illustrative step, step 710, a contact reconciler such as the contact reconcilers discussed previously with reference to FIGS. 2 and 3, determines that a first and a second mobile device are associated with an instant-connect service. In embodiments, the first mobile device has an associated first set of contacts and the second mobile device has an associated second set of contacts.

At step 712, the contact reconciler searches a stored copy of the first set of contacts, looking for contacts corresponding to additional mobile devices associated with the instant-connect service. At step 714, the contact reconciler identifies a third mobile device associated with the instant-connect service that has a corresponding contact in the first set of contacts. In an embodiment, the contact reconciler identifies the third mobile device by determining that the third mobile device has a corresponding instant-connect identifier such as a UFMID. In other embodiments, the contact reconciler identifies the third mobile device by performing a table-lookout, query, or the like.

At step 716, the contact reconciler determines that the contact information in the first set of contacts corresponding to the third device does not include an instant-connect identifier. At step 718, the contact reconciler retrieves an instant-connect identifier corresponding to the third mobile device and at step 720, the contact reconciler updates the stored copy of the first set of contacts to include the instant-connect identifier corresponding to the third mobile device. At a final illustrative step, step 724, the contact reconciler synchronizes the second set of contacts with the updated stored second set of contacts.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. Non-transitory computer-readable media having computer-executable instructions embodied thereon that, when executed, facilitate a method of reconciling contact information between a first mobile device that is associated with a first user having a corresponding set of first contact information and a second mobile device that is associated with a second user having a corresponding set of second contact information, the method comprising:
   determining that the first and second mobile devices are associated with an instant-connect service;
   searching the first set of contacts for additional contacts corresponding to mobile devices associated with the instant-connect service;
   identifying a third mobile device associated with the instant-connect service that corresponds to a contact in the first set of contacts, wherein the contact includes a portion of a third set of contact information, the third set of contact information corresponding to the third mobile device;
   determining that the at least a portion of the second contact information does not include an instant-connect identifier corresponding to the third mobile device; and
   adding an instant-connect identifier corresponding to the third mobile device to the second set of contacts.

2. The media of claim 1, further comprising providing a notification to the second mobile device to inform the second user of the update to second set of contacts.

3. The media of claim 1, further comprising receiving an indication of an addition of a new user's contact information to the second set of contacts.

4. A method of reconciling contact information between a first mobile device that is associated with a first user having a corresponding set of first contact information and a second mobile device that is associated with a second user having a corresponding set of second contact information, the method comprising:
   determining that the first and second mobile devices are associated with an instant-connect service;
   searching the first set of contacts for additional contacts corresponding to mobile devices associated with the instant-connect service;
   identifying a third mobile device associated with the instant-connect service that corresponds to a contact in the first set of contacts, wherein the contact includes a portion of a third set of contact information, the third set of contact information corresponding to the third mobile device;

determining that the at least a portion of the second contact information does not include an instant-connect identifier corresponding to the third mobile device; and adding an instant-connect identifier corresponding to the third mobile device to the second set of contacts.

5. The method of claim 4, further comprising providing a notification to the second mobile device to inform the second user of the update to second set of contacts.

6. The method of claim 4, further comprising receiving an indication of an addition of a new user's contact information to the second set of contacts.

* * * * *